(12) United States Patent
Xu et al.

(10) Patent No.: US 11,108,797 B2
(45) Date of Patent: Aug. 31, 2021

(54) TIMELY DETECTION OF NETWORK TRAFFIC TO REGISTERED DGA GENERATED DOMAINS

(71) Applicant: Stellar Cyber, Inc., Santa Clara, CA (US)

(72) Inventors: Zhang Xu, Foster City, CA (US); Changming Liu, Cupertino, CA (US)

(73) Assignee: Stellar Cyber, Inc., Santa Clara, CA (US)

( * ) Notice: Subject to any disclaimer, the term of this patent is extended or adjusted under 35 U.S.C. 154(b) by 399 days.

(21) Appl. No.: 16/298,823

(22) Filed: Mar. 11, 2019

(65) Prior Publication Data

US 2019/0281079 A1   Sep. 12, 2019

Related U.S. Application Data

(60) Provisional application No. 62/641,689, filed on Mar. 12, 2018.

(51) Int. Cl.
*H04L 29/06* (2006.01)
*H04L 29/12* (2006.01)
*H04L 29/08* (2006.01)
*G06F 15/16* (2006.01)

(52) U.S. Cl.
CPC ...... *H04L 63/1425* (2013.01); *H04L 61/1511* (2013.01); *H04L 63/1441* (2013.01); *H04L 67/2852* (2013.01)

(58) Field of Classification Search
USPC .................................. 726/11, 22, 23, 24, 25
See application file for complete search history.

(56) References Cited

U.S. PATENT DOCUMENTS

| | | | | |
|---|---|---|---|---|
| 9,917,852 | B1* | 3/2018 | Xu | H04L 63/1483 |
| 2015/0373039 | A1* | 12/2015 | Wang | H04L 63/1425 |
| | | | | 726/23 |
| 2015/0373043 | A1* | 12/2015 | Wang | G06F 21/6254 |
| | | | | 706/12 |
| 2017/0359447 | A1* | 12/2017 | Chan | H04L 45/74 |
| 2018/0205753 | A1* | 7/2018 | Raz | H04L 63/1425 |
| 2019/0387005 | A1* | 12/2019 | Zawoad | H04L 63/1425 |

* cited by examiner

*Primary Examiner* — Jude Jean Gilles
(74) *Attorney, Agent, or Firm* — Stella Cyber IP Legal

(57) ABSTRACT

A non-transitory computer-readable medium having a program stored thereon that, when executed by one or more processors, directs a computing system to secure a communication network. The program comprises a traffic inspection engine, a domain generation algorithm (DGA) inspection engine, and a message bus communicationally coupling the traffic inspection engine and the DGA inspection engine. The traffic inspection engine is configured to identify if a traffic session containing a domain name system (DNS) request and/or response in a communication network includes a DGA generated domain and send information about the identified DGA generated domain to the DGA inspection engine via the message bus. The DGA inspection engine is configured to verify if the identified DGA generated domain is registered, and send information about the registered DGA domain to the traffic inspection engine via the message bus. The traffic inspection engine is further configured to inspect, using the information about the registered DGA generated domain, if a subsequent traffic session in the communication network contains the registered DGA generated domain.

20 Claims, 5 Drawing Sheets

TIMELY DETECTION OF NETWORK TRAFFIC TO REGISTERED DGA GENERATED DOMAINS

CROSS-REFERENCE TO RELATED APPLICATIONS

This application claims the benefit of and priority to U.S. Provisional Application No. 62/641,689 filed Mar. 12, 2018, the disclosure of all of which is incorporated herein by reference in its entirety.

TECHNICAL FIELD

This application relates generally to computer networking. In particular, various embodiments of systems and methods for timely detection of domain names generated by domain generation algorithms (DGAs) and prevention of network traffic to registered DGA generated domains are described.

BACKGROUND

Domain generation algorithms (DGAs) are algorithms that periodically and dynamically generate a large number of domain names. DGAs are often used by malware or ransomware to create botnets in which a command and control (CnC) server remotely controls infected computing devices. Because only a small portion of DGA generated domain names are actually registered whereas a large portion of the DGA generated domain names are unregistered and used to masquerade the registered ones, it is difficult for signature or IP reputation-based security detection systems to effectively detect and then shut down the infected computing devices.

There is therefore a need for a system and method for detection of registered DGA generated domain names. There is a particular need for a system and method that can timely detect registered DGA generated domain names and inspect network traffic to servers hosting the registered DGA domain names. There is a need for a detection system and method that can be tightly integrated with a prevention system to block network traffic to registered DGA generated domains.

BRIEF SUMMARY

Some embodiments of the disclosure provide a non-transitory computer-readable medium storing a program that, when executed by one or more processors, directs a computing system to secure a communication network. The program comprises a traffic inspection engine, a DGA inspection engine, and a message bus communicationally coupling the traffic inspection engine and the DGA inspection engine. The traffic inspection engine is configured to identify if a traffic session containing a domain name system (DNS) request and/or response in a communication network includes a DGA generated domain, and send information about the identified DGA generated domain to the DGA inspection engine via the message bus. The DGA inspection engine is configured to verify if the identified DGA generated domain is registered, and send information about the registered DGA domain to the traffic inspection engine via the message bus. The traffic inspection engine is further configured to inspect, using the information about the registered DGA generated domain, if a subsequent traffic session in the communication network contains the registered DGA generated domain.

Some embodiments of the disclosure provide a computer-implemented method. The method comprises inspecting a traffic session containing a DNS request and/or response in a communication network to identify if the DNS request and/or response contains a DGA domain, verifying if the DGA generated domain is registered by resolving the DGA generated domain, and inspecting a subsequent traffic session in the communication network using information about the registered DGA generated domain.

Some embodiments of the disclosure provide a computing apparatus comprising one or more processors and one or more memory devices having a program stored thereon that, when executed by the one or more processors, directs the computing apparatus to carry out operations to secure a communication network. The operations comprise inspecting a traffic session containing a DNS request and/or response in a communication network, to identify if the DNS request and/or response contains a DGA generated domain, verifying if the DGA generated domain is registered by resolving the DGA generated domain, and inspecting a subsequent traffic session in the communication network using information about the registered DGA generated domain.

This Brief Summary is provided to introduce selected aspects and embodiments of this disclosure in a simplified form and is not intended to identify key features or essential characteristics of the claimed subject matter, nor is it intended to be used as an aid in determining the scope of the claimed subject matter. The selected aspects and embodiments are presented merely to provide the reader with a brief summary of certain forms the invention might take and are not intended to limit the scope of the invention. Other aspects and embodiments of the disclosure are described in the section of Detailed Description.

BRIEF DESCRIPTION OF THE DRAWINGS

These and various other features and advantages will become better understood upon reading of the following detailed description in conjunction with the accompanying drawings and the appended claims provided below, where:

DETAILED DESCRIPTION OF EMBODIMENTS

Embodiments of the disclosure provide a system and method for detecting and preventing malicious activities of domain generation algorithms (DGAs) in a communication network. The DGA detection system of the disclosure can identify DGA generated domains and computers infected by DGA based malware. Once DGA generated domains are identified, the disclosed DGA detection system can further detect if any of the DGA domain names has been registered. A registered DGA domain name can cause actual harm because a DGA based malware may use an actual command and control (CnC) server to remotely control the infected computers to call home, update malware, and/or conduct other malicious activities. Therefore, it is important to detect the registered DGA domain to avoid false positive errors. The DGA detection system of the disclosure can differentiate the registered DGA domain names from unregistered ones. In addition, the DGA detection system of the disclosure can timely propagate the knowledge of registered DGA domains and their corresponding IP addresses to all other security prevention or detection systems in place to prevent infected computers in the network from calling home. For example, the user can establish a firewall rule to stop network traffic to and/or from the IP address of registered DGA domain. The DGA detection system of the disclosure can further detect if any computer in a network actually calls home with registered DGA domains. If the infected computer calls home, some damage might have already been done, either some data are exfiltrated, the malware gets updated, or new malware is installed. As such, further security measure may be taken to quarantine or clean up the infected computer.

Various embodiments will now be described with reference to the figures. It should be noted that some figures are not necessarily drawn to scale. The figures are only intended to facilitate the description of specific embodiments, and are not intended as an exhaustive description or as a limitation on the scope of the disclosure. Further, in the figures and description, specific details may be set forth in order to provide a thorough understanding of the disclosure. It will be apparent to one of ordinary skill in the art that some of these specific details may not be employed to practice embodiments of the disclosure. In other instances, well known components or process steps may not be shown or described in detail in order to avoid unnecessarily obscuring embodiments of the disclosure.

Figure 1:
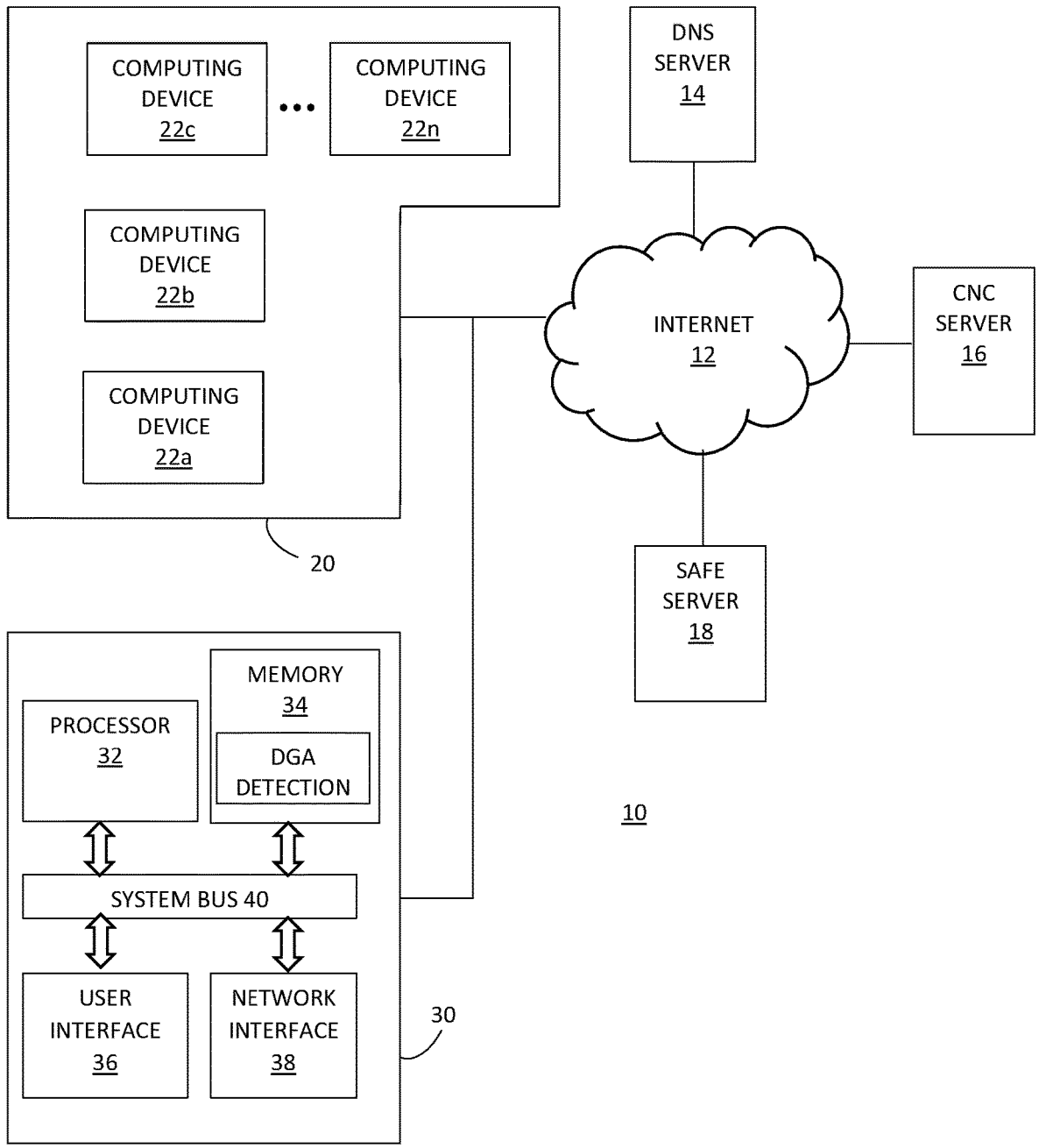
FIG. 1 is a block diagram illustrating an exemplary communication network employing a DGA detection system according to embodiments of this disclosure.

FIG. 1 is a block diagram illustrating a communication network 10 in which the techniques of this disclosure can be employed. The communication network 10 in general includes a computer system 20 and a DGA detection apparatus 30 configured to secure the computer system against DGA activities in the communication network. As shown, the computer system 20 and DGA detection apparatus 30 may be connected to the Internet 12 and interconnected via suitable network interfaces. A domain name system (DNS) server 14, a command and control (CnC) server 16 hosting a registered DGA domain, and one or more safe servers 18 may be connected to the communication network 10 via the Internet 12. It should be noted that while the computer system 20 and the DGA detection apparatus 30 are shown in FIG. 1 as separate systems for ease of description of various embodiments of the disclosure, in practice, the DGA detection apparatus 30 may be part of the computer system 20. A DGA detection program of the disclosure, to be described in greater detail below, may be installed in both the DGA detection apparatus 30 and the computer system 20. The computer system 20 may be an enterprise computer network comprising a plurality of computing devices 22a, 22b, 22c . . . 22n, one or more of which may be subjected to attack by DGA based malware. In some embodiments, the computer system 20 may be a distributed system, wherein one or more of the computing devices 22a-22n may communicate with one or more other computing devices via a network such as the Internet 12. The computing devices 22a-22n may be any data processing devices, including workstations, desktop or laptop computers, mobile phones, routers, switching devices, server computers receiving and sending messages from and to other computing devices, etc. In some embodiments, the computing devices 22a-22n may be virtual machines operating within a virtualized computing environment using the DGA detection apparatus 30 of this disclosure to provide security against DGA activities in the communication network.

The DGA detection apparatus 30 includes a processor 32, memory 34, a user interface 36, and a network interface 38, each of which may be coupled to a system bus 40. The memory 34 stores a DGA detection program which, in response to execution by the processor 32, cause the DGA apparatus 30 to carry out operations to secure the computer system 20 against DGA activities in the communication network 10, as will be described in greater detail below.

The processor 32 may include one or more processors that are generally known in the art, such as an INTEL® processors, an AMD® processors, or a graphical processing unit (GPU), such as an NVIDIA® GPU, or other type of processing unit. The processor 32 may retrieve and execute computer-executable instructions from the memory 34, which may cause the processor 32 to perform any of the methods and/or steps according to the embodiments of this disclosure.

The memory 34 may include any one of or a combination of volatile memory elements and nonvolatile memory elements. The memory 34 may include a random-access memory (RAM) or other dynamic storage device for storing information and instructions to be executed by the processor 32, and for storing temporary variables or other intermediate information during execution of instructions by the processor 32. The memory 34 may also include read-only memory (ROM) or other static storage device for storing static information and instructions for the processor 32. The memory 34 may further include a data storage device such as a magnetic disk or optical disk, for storing information and instructions. The memory 34 (e.g. a non-transitory computer-readable medium) may comprise programs (logic) for operating the computer system and for performing applications including DGA detection as will be described in greater detail below.

The user interface 36 may include devices or components with which a user interacts with the DGA detection apparatus 30, such as a keyboard, pointing device, pen, touch input device, voice input device, or the like. Output devices (not shown in FIG. 1) such as a display device, printer, speaker etc. may also be included in the DGA detection apparatus 30.

The network interface 38 allows the DGA detection apparatus 30 to communicate with other devices or systems over a communication network. The network interface 38 may include a Wi-Fi interface, Ethernet interface, Bluetooth interface, or other wireless or wired interfaces. The network interface 38 allows the DGA detection apparatus 30 to receive and send electrical, electromagnetic or optical signals that carry data streams representing various types of information. For instance, the network interface 38 may allow the DGA detection apparatus 30 to receive data streams representing software programs for DGA detection and traffic inspection over the communication network 12.

Still referring to FIG. 1, the computing devices 22a-22n in the computer system 20 may communicate with other devices in the communication network 10 over the Internet 12 using suitable communication protocols such as transmission control protocol (TCP) and internet protocol (IP). By way of example, in communicating with a server computer 18 using TCP/IP protocols, one or more computing devices e.g. computing device 22a implemented with a web browser may send domain name system (DNS) requests to an DNS server 14 and receive DNS responses from the DNS server 14. DNS requests are one form of network communications that may originate from a client device e.g., a computing device 22a, in the form of a DNS query packet. Each DNS query packet is addressed to a DNS server which will perform domain name resolution on a particular domain name. For example, a computing device 22a in the computer system 20 may issue a DNS query packet for a web address e.g. "www.aelladata.com," which may be hosted e.g. at server 18. The DNS server 14 may send a response message with the IP address of the domain name "www.aelladata.com" back to the computing device 22a from where the corresponding DNS server request originated. All such requests and responses will represent network traffic information or traffic flow sessions.

Malware may use a DGA to generate a large number of domain names. A hacker may practically or actually register only one or a small portion of DGA generated domains and leave the remaining large portion unregistered to masquerade the registered domain. For example, a DGA may generate over 1000 domain names including e.g. from xyzwer1, xyzwer2 ... to xyzwer1000. A hacker may register only one of the DGA generated domains, e.g., xyzwer500, to create a botnet using a command and control (CnC) server e.g. CNC server 16, and leave the rest of 999 domains unregistered to masquerade the registered xyzwer500. Once a botnet is created, the CnC server 16 may callback one or more infected computing devices e.g. computing device 22b to conduct various malicious activities.

The DGA detection system or program of this disclosure can effectively detect DGA activities involving any computing devices 22a-22n in the computer system 20 and protect the computer system 20 from attack by DGA based malware. The DGA detection system of the disclosure is configured to verify resolvable DGA domains and timely inspect traffic flow from and/or to the computing devices 22a-22n using the resolvable DGA domain information to monitor any malicious activities. The DGA detection system can be tightly integrated with a prevention system to block traffic flow to or from CnC servers and clean up the infected computing devices.

Figure 2:
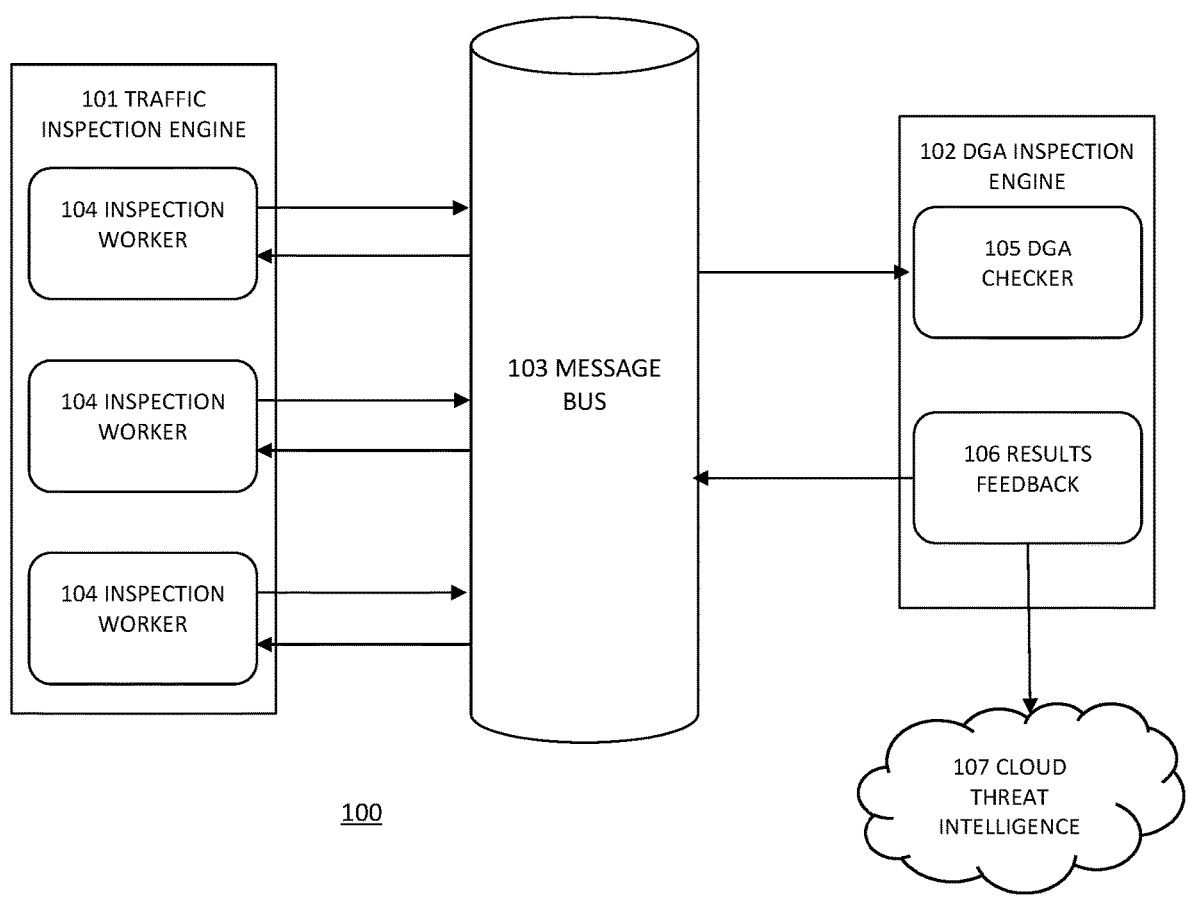
FIG. 2 is a block diagram illustrating an exemplary architecture of a DGA detection system according to embodiments of the disclosure.

FIG. 2 is a block diagram illustrating an exemplary architecture of a DGA detection system 100 according to embodiments of the disclosure. In the following description and appended claims, terms such as "engine," "inspection worker," "DGA checker," or the like may be used for ease of describing various embodiments of the DGA detection system. It will be understood by one of ordinary skill in the art that the terms "engine," "inspection worker," or "DGA checker" refer to a software component implemented to preform one or more described functions, determinations, calculations, and/or operations of an overall system.

As shown in FIG. 2, the DGA detection system 100 of the disclosure includes a traffic inspection engine 101, a DGA inspection engine 102, and a message bus 103 communicationally coupling the traffic inspection engine 101 and the DGA inspection engine 102. The traffic inspection engine 101 may extract DNS requests and/or responses, or DNS transactions, and identify if the DNS transactions contain any suspicious DNS requests and/or responses such as DGA generated domain names, and send any suspicious DNS transactions to the DGA inspection engine 102 via the message bus 103 for further verification. The DGA inspection engine 102 may check or verify if any DGA generated domain name is resolvable or registered with a DNS server, and send back information about the resolvable DGA domain to the traffic inspection engine 101 via the message bus 103. The knowledge about resolvable DGA domains can also be provided to a cloud threat intelligence 107 to be shared with other communication networks. Using the knowledge about the resolvable DGA domains, the traffic inspection engine 101 can further inspect subsequent traffic sessions in the communication network, and enrich or mark any traffic session that contains registered DGA domains and send the enriched traffic section to a prevention system for further security analysis and clean up.

Still referring to FIG. 2, the traffic inspection engine 101 may include a plurality of inspection workers 104. Each of the plurality of the inspection workers 104 may perform the tasks of the inspection engine 101. In some embodiments, the plurality of inspection workers 104 reside on a plurality of computing devices in a computer system respectively as shown in FIG. 1. As such, the inspection engine 101 may process network traffic, perform inspection and/or analysis of network traffic from and/or to a plurality of computing devices distributed across the communication network.

Each of the inspection workers 104 may be configured to detect DNS request and/or response messages and extract DNS transactions from the network traffic. DNS is a fundamental protocol for the Internet and a well-known port 53 is reserved for DNS. Most firewalls have an outgoing policy to allow DNS traffic to go out. However, hackers may take advantage of port 53 to send traffic out without following the DNS message format, using a technique so called DNS tunneling. A deep packet inspection (DPI) engine may be included in the inspection workers 104 to identify DNS applications more precisely.

Once a network application is identified as DNS and domain names in either DNS queries or responses are extracted, an analysis may be performed to determine if the domain names are generated by a DGA. Various DGA detection mechanisms are known and their detailed description is omitted herein to focus on description of embodiments of this disclosure. In general, a DGA detection mechanism can be based on Shannon Entropy or Ngrams. A DGA detection mechanism may also be based on machine learning. With machine learning, Ngrams, Shannon Entropy, and length of the domain names can be used as features.

Once DGA generated domain names or suspicious DNS transactions are detected, the information can be sent, via the message bus 103, to the DGA inspection engine 102 for further inspection.

Still referring to FIG. 2, the DGA inspection engine 102 may include a DGA inspection checker 105 and a result feedback 106. The DGA inspection checker 105 is configured to check if a DGA domain has been registered. The DGA inspection checker 105 can be configured to check either DNS requests or DNS responses. In accordance with embodiments of the disclosure, the DGA inspection checker 105 is configured to keep track of DNS transactions, checking both DNS requests and DNS responses. By way of non-limiting example, if a domain in a DNS request is identified as a DGA domain, its corresponding response is marked as DGA response and will be further inspected. A DNS response can have different reply codes based on the lookup results performed by a DNS server. Most DGA domains are not valid, i.e. they cannot be resolved to IP addresses, either ipv4 or ipv6 addresses. The DNS requests querying those domains will receive a reply code of 3, which stands for NXDomain, meaning that the domain cannot be resolved to an IP address or the domain does not exist. In contrast, if a DGA domain points to the real CnC server, the corresponding DNS request will receive a reply code of 0 in its response, which indicates a successful DNS lookup.

In accordance with embodiments of the disclosure, once a check of a DGA response receives a reply code of 0, the DGA inspection checker 105 further inspects the answer section of the DNS response. The answer section contains the actual lookup results. If record A or record AAAA is found in the answer section, then the DGA response is confirmed to be a valid response and the DGA domain is identified as a registered DGA domain, or a resolvable DGA domain. The result feedback 106 sends the inspection results back to the traffic inspection engine 101, via the message bus 103. In accordance with embodiments of the disclosure, the result feedback 106 sends only the information about the resolvable DGA domain back to the traffic inspection engine 101. The traffic inspection engine 101 will then further inspect subsequent traffic sessions based on the information of resolvable DGA domain. This will significantly reduce positive detection errors.

Still referring to FIG. 2, the message bus 103 communicationally couples the traffic inspection engine 101 and the DGA inspection engine 102. The message bus 103 provides producer and consumer queues for message transmission between the traffic inspection engine 101 and the DGA inspection checker 105. To the message bus 103, traffic inspection workers 104 send suspicious DNS transactions. The DGA checker 105 listens on the message bus 103 and consumes the DNS transactions sent by inspection works 104. In accordance with embodiments of the disclosure, the message bus 103 is configured so that the traffic inspection engine 101 and the DGA inspection checker 105 subscribe the message bus 103 actively, allowing the traffic inspection engine 101 and the DGA inspection checker 105 to get messages from each other in time, thereby minimizing or reducing detection latency. In some embodiments, only DGA domains that are resolved with correct A or AAAA records are sent back to the message bus 103, ensuring low false positive rate by the traffic inspection engine 101. By way of non-limiting example, the message bus 103 can be implemented using a KAFKA platform. The message bus 103 can also be other implementations using other data stream platforms to ensure high-throughput, low-latency message transmission. In some embodiments, the message bus comprises an application programming interface (API).

Figure 3:
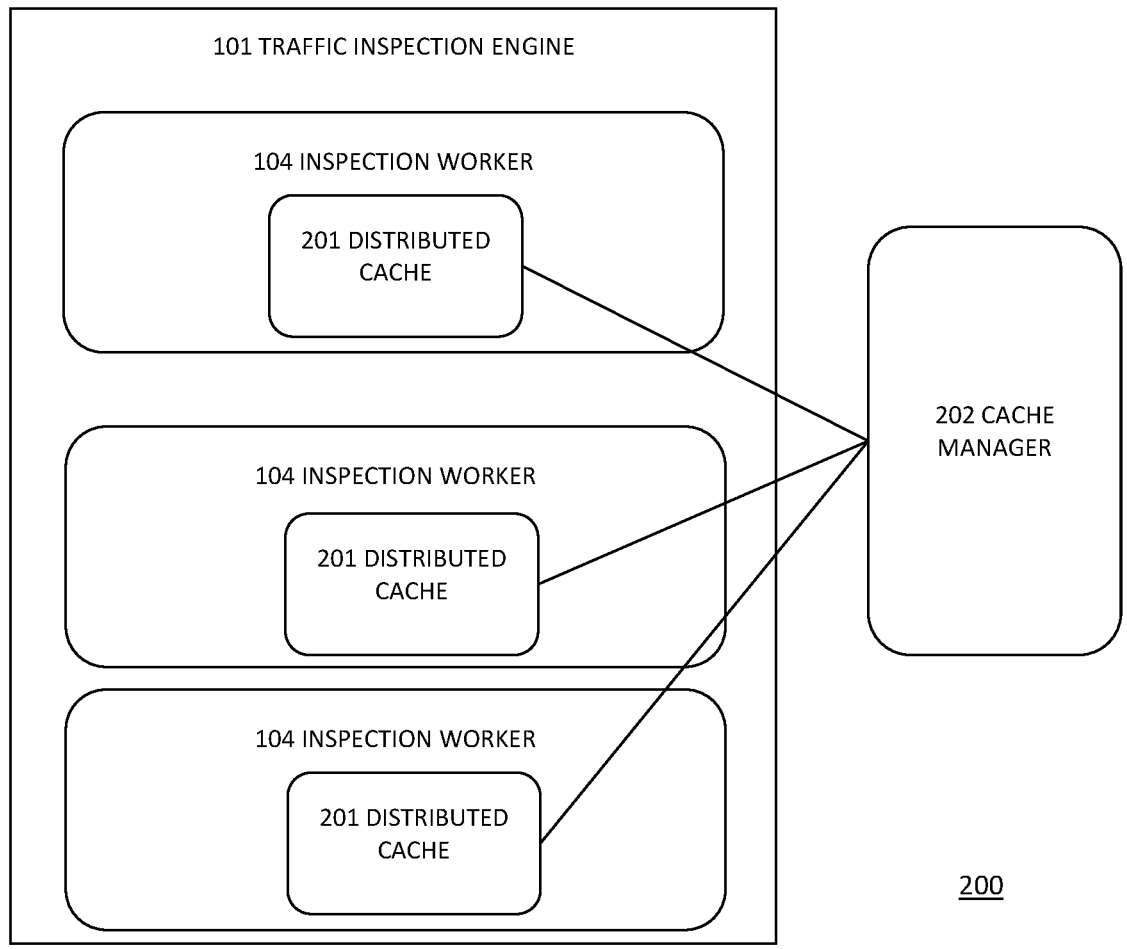
FIG. 3 is a block diagram illustrating an exemplary distributed cache management system according to embodiments of the disclosure.

FIG. 3 is a block diagram illustrating an exemplary distributed cache management system 200 in accordance with embodiments of the disclosure. The distributed cache system 200 includes a plurality of distributed caches 201 and a cache manager 202 coupled to each of the plurality of the distributed caches 201. As shown, each inspection worker 104 may be provided with a distributed cache 201. Those caches 201 are managed by the cache manager 202. When any cache 201 of a particular inspection worker 104 receives a message from the DGA inspection engine 102, all other caches 104 will get updated with the same information so that each inspection worker 104 can correlate in inspecting subsequent network traffic. In accordance with some embodiments of the disclosure, each cache 201 may include a timer inside, configured to allow the resolved DGA information to be stored for a certain period of time. The time that the DGA information remains in the cache 201 can be determined e.g. by the time-to-live (TTL) as specified by the DNS server in the DGA response. This expiration policy or setup allows aging out of the DGA information. Most DGA domains usually have a short life cycle, which means that the resolved IP addresses can be recycled and used by other organizations in a short time. The expiration policy provided by the timer in the cache management system 200 ensures that the traffic inspection engine 101 does not generate false positives that falsely take an IP as a DGA IP even after the IP is recycled and used by legitimate domains.

Figure 4:
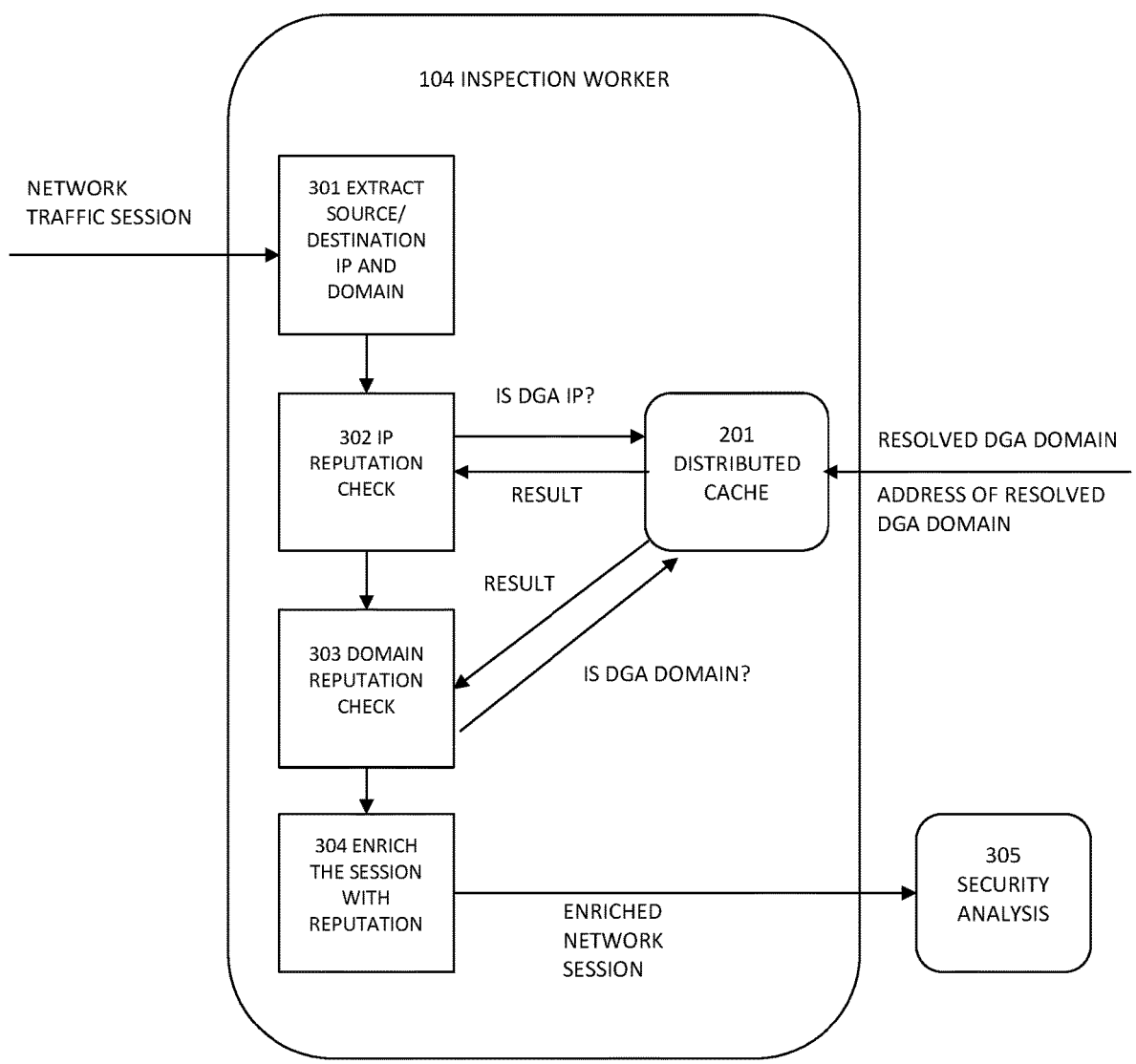
FIG. 4 is a block diagram illustrating correlation of traffic inspection results with DGA detection results according to embodiments of the disclosure.

FIG. 4 is a block diagram illustrating correlation of traffic inspection with DGA inspection results in accordance with embodiments of the disclosure. As shown, resolved DGA information is provided via the message bus 103 to an inspection worker 104. The resolved DGA information may contain the domain name that is registered and an IP addresses that is associated with the domain. Upon receipt of the resolved DGA information, the inspection worker 104 may store the resolved DGA information in the distributed cache 201. The inspection worker 104 uses the resolved DGA information to inspect subsequent network traffic sessions and enrich or mark the session information accordingly. By way of non-limiting example, at block 301, the inspection worker 104 may first extract source and destination IP address and domain information from the traffic session. Then at 302, the source and destination IP are checked for their reputation. If the IP address has an entry of DGA IP address as that stored in the distributed cache 201, then its reputation will be marked as potential CnC. Likewise at 303, if the traffic session involves a domain that has a record of DGA domain stored in the distributed cache 201, the domain will be marked as a DGA domain in the session information. After the session information is fully enriched in 304, i.e. new reputation attributes are added to the session information, it can be sent to further security analysis at 305. The architecture shown in FIG. 3 allows the resolved DGA information to be fed back to traffic inspection, providing an effective correlation and enrichment pipeline.

The DGA detection system 100 shown in FIGS. 2-4 can timely feed resolvable DGA information from the DGA inspection engine 102 to the traffic inspection engine 101. The tight correlation between DGA inspection and traffic inspection allows for low detection latency and thus significantly reduces false positive rate in DGA detection. The expiration policy set up in the traffic inspection engine 101 allows for aging out of the DGA information. The distributed cache management enables the DGA detection system 100 to accomplish distributed knowledge fetch and update for a big data platform. The DGA detection system 100 can also provide zero-day DGA knowledge across multiple platforms.

Figure 5:
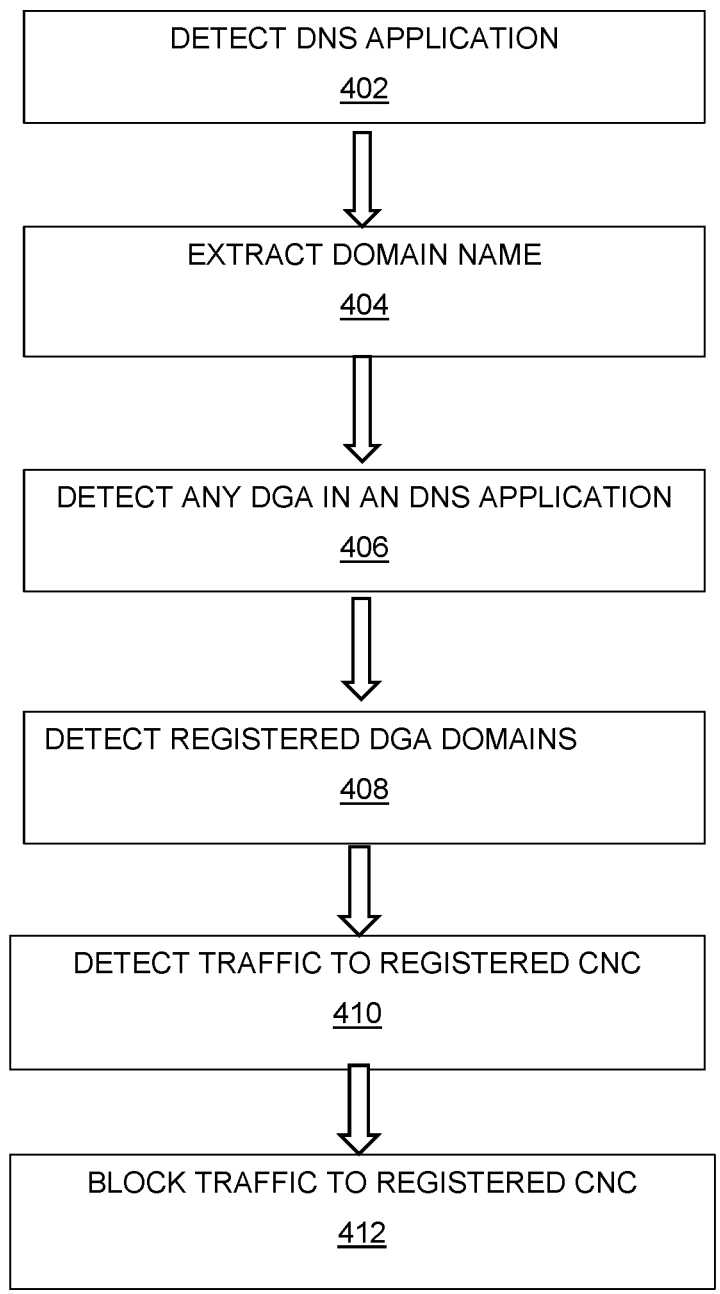
FIG. 5 is a flowchart illustrating a DGA detection method according to embodiments of the disclosure.

Referring to FIG. 5, a method of DGA detection and prevention of network traffic to a registered CNC according to embodiments of the disclosure will now be described. The computer-implemented method may start at block 402 by detecting a DNS application in a network traffic. DGA is usually detected via DNS request and/or response messages. A deep packet inspection (DPI) engine may be implemented to identify DNS applications more precisely.

At block 404, once a network application is identified as a DNS application, the domain names either in DNS query or DNS response messages are extracted. To extract the right domain name, a DPI engine can be implemented to parse the content of the DNS message.

At block 406, the method may proceed to detect any DGA generated domain in a DNS application. Various DGA detection mechanisms are known and can be used in detecting DGA generated domain in a DNS application, including Shannon Entropy or Ngrams based detection mechanism or machine learning based detection mechanism.

At block 408, the method may proceed to detect if the identified DGA domain has been registered. Both the DNS requests and DNS responses are inspected in verifying if the DGA domain is registered. According to embodiments of the disclosure, a DGA detection system shown in FIGS. 2-4 is used. Advantageously, the DGA detection system shown in FIGS. 2-4 can tightly couple the DGA domain detection with the network traffic inspection. Other alternative systems for detecting registered DGA domains may also be used.

At block 410, the method may proceed to detect if any traffic has been sent to the CNC server hosting the registered DGA domain. The DGA detection system shown in FIGS. 2-4 can timely feed the DGA inspection results back to a traffic inspection engine to immediately detect subsequent traffic sessions before any damage is done.

At block 412, measures can be taken to block any traffic to the CNC server to minimize any damages. The DGA detection system shown in FIGS. 2-4 can be integrated with a prevention system such as Firewall or IPS. A rule can be inserted immediately to block all the traffic to the registered DGA domain.

Various embodiments of a DGA detection method are described in connection with FIG. 5. It will be appreciated that more or fewer steps, actions, or processes may be incorporated into the method without departing from the scope of the disclosure. No particular order is implied by the arrangement of blocks shown and described herein. The invention may be in the form of a computer product comprising a computer-readable medium storing or carrying instructions which, when executed by a computer processor, cause the computer processor to perform the methods described in the disclosure. The instructions may be implemented as software code to be executed by a processor using any suitable computer language such as, Java, C++ or Perl using, e.g. conventional or object-oriented techniques. The computer-readable medium may include any suitable medium that is capable of storing or encoding a sequence of instructions for execution by the computer processor and that causes the computer processor to perform any one of the methodologies of the present invention. The computer-readable medium shall accordingly include, but not be limited to, solid-state memories, optical and magnetic disks. Examples of computer-readable medium include volatile and nonvolatile, removable and non-removable media for storage of computer-readable instructions. By way of non-limiting example, the computer-readable medium includes random access memory (RAM), read only memory (ROM), electrically erasable programmable ROM (EEPROM) flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information. In some embodiments, the instructions or software program may be encoded and transmitted using carrier signals adapted for transmission via wired, optical, and/or wireless networks conforming to a variety of protocols, including the Internet. As such, a computer-readable medium may be created using a data signal encoded with such programs. A computer-readable medium encoded with the program code may be packaged with a compatible device or provided separately from other devices e.g. via Internet download. Further, any such computer-readable medium may reside on or within a computer product e.g. a hard drive, a CD, or an entire computer system.

All technical and scientific terms used herein have the meaning as commonly understood by one of ordinary skill in the art unless specifically defined otherwise. As used in the description and appended claims, the singular forms of "a," "an," and "the" include plural references unless the context clearly dictates otherwise. The term "or" refers to a nonexclusive "or" unless the context clearly dictates otherwise. Further, the term "first" or "second" etc. may be used to distinguish one element from another in describing various similar elements. It should be noted the terms "first" and "second" as used herein include references to two or more than two. Further, the use of the term "first" or "second" should not be construed as in any particular order unless the context clearly dictates otherwise.

Those skilled in the art will appreciate that various other modifications may be made. All these or other variations and modifications are contemplated by the inventors and within the scope of the invention.

What is claimed is:

1. A non-transitory computer-readable medium storing a program that, when executed by one or more processors, directs a computing system to secure a communication network, the program comprising:

a traffic inspection engine, a domain generation algorithm (DGA) inspection engine, and a message bus communicationally coupling the traffic inspection engine and the DGA inspection engine, wherein the traffic inspection engine is configured to identify if a traffic session containing a domain name system (DNS) request and/or response in a communication network includes a DGA generated domain and send information about the identified DGA generated domain to the DGA inspection engine via the message bus, wherein the DGA inspection engine is configured to verify if the identified DGA generated domain is registered, and send information about the registered DGA domain to the traffic inspection engine via the message bus, and wherein the traffic inspection engine is further configured to inspect, using the information about the registered DGA generated domain, if a subsequent traffic session in the communication network contains the registered DGA generated domain.

2. The non-transitory computer-readable medium of claim 1, wherein the traffic inspection engine is further configured to extract domain names.

3. The non-transitory computer-readable medium of claim 1, wherein the traffic inspection engine comprises a plurality of inspection workers configured to extract and/or inspect network traffic from and/or to a plurality of computing devices distributed in the communication network.

4. The non-transitory computer-readable medium of claim 3, wherein each of the plurality of inspection workers comprises a cache configured to store information from the DGA inspection engine.

5. The non-transitory computer-readable medium of claim 4, wherein the cache of each of the plurality of inspection workers comprises a timer configured to store the information from the DGA inspection engine for a specified period of time.

6. The non-transitory computer-readable medium of claim 4, wherein the traffic inspection engine further comprises a cache manager coupled with the cache of each of the plurality of inspection workers.

7. The non-transitory computer-readable medium of claim 1, wherein the DGA inspection engine comprises a DGA checker configured to check a reply code and answer of a DNS response.

8. The non-transitory computer-readable medium of claim 1, wherein the DGA inspection engine comprises a result-feedback configured to send information about the registered DGA generated domain to the message bus.

9. The non-transitory computer-readable medium of claim 7, wherein the result-feedback is further configured to provide information about the registered DGA generated domain to a cloud thread intelligence.

10. The non-transitory computer-readable medium of claim 1, wherein the message bus comprises an application programming interface (API).

11. A computer-implemented method, comprising:
inspecting a traffic session containing a domain name system (DNS) request and/or response in a communication network, to identify if the DNS request and/or response contains a domain generated by a domain generation algorithm (DGA);
verifying if the DGA generated domain is registered by resolving the DGA generated domain; and
inspecting a subsequent traffic session in the communication network using information about the registered DGA generated domain.

12. The computer-implemented method of claim 11, wherein the inspecting of the subsequent traffic session is performed within a time period specified by a time-to-live in a DNS response in resolving the DGA generated domain.

13. The computer-implemented method of claim 11, further comprising enriching the subsequent traffic session and sending the enriched subsequent traffic session for security analysis if the subsequent traffic session inspected contains the registered DGA generated domain.

14. The computer-implemented method of claim 11, further comprising blocking network traffic to a server hosting the DGA generated domain if the subsequent traffic session inspected contains the registered DGA generated domain.

15. The computer-implemented method of claim 11, further comprising providing information about the registered DGA generated domain to a cloud threat intelligence.

16. The computer-implemented method of claim 11, wherein the inspecting of the subsequent traffic session comprises concurrently inspecting a plurality of traffic sessions from and/or to a plurality of computing devices distributed in the communication network.

17. A computing apparatus, comprising one or more processors and one or more memory devices having a program stored thereon that, when executed by the one or more processors, directs the computing apparatus to carry out operations to secure a computer network, the operations comprising:
inspecting a traffic session containing a domain name system (DNS) request and/or response in a communication network, to identify if the DNS request and/or response contains a domain generated by a domain generation algorithm (DGA);
verifying if the DGA generated domain is registered by resolving the DGA generated domain; and
inspecting a subsequent traffic session in the communication network using information about the registered DGA generated domain.

18. The computer apparatus of claim 17, wherein the inspecting of the subsequent traffic session is performed within a time period specified by a time-to-live in a DNS response in resolving the DGA generated domain.

19. The computer apparatus of claim 17 further comprising enriching the subsequent traffic session and sending the enriched subsequent traffic session for security analysis if the subsequent traffic session inspected contains the registered DGA generated domain.

20. The computer apparatus of claim 17, further comprising blocking network traffic to a server hosting the DGA generated domain if the subsequent traffic session inspected contains the registered DGA generated domain.

* * * * *